US012756094B2

(12) United States Patent
Sikri

(10) Patent No.: US 12,756,094 B2
(45) Date of Patent: Oct. 6, 2026

(54) SCALABLE MULTI BEAMFORMING TOPOLOGY SUPPORTING AN ELECTRONICALLY STEERED ARRAY ANTENNA

(71) Applicant: SatixFy UK Limited, Farnborough (GB)

(72) Inventor: Divaydeep Sikri, Farnborough (GB)

(73) Assignee: SatixFy UK Limited, Farnborough (GB)

(*) Notice: Subject to any disclaimer, the term of this patent is extended or adjusted under 35 U.S.C. 154(b) by 589 days.

(21) Appl. No.: 17/892,522

(22) Filed: Aug. 22, 2022

(65) Prior Publication Data

US 2023/0087065 A1 Mar. 23, 2023

Related U.S. Application Data

(63) Continuation of application No. PCT/EP2021/054082, filed on Feb. 18, 2021.

(30) Foreign Application Priority Data

Feb. 21, 2020 (GB) ..................................... 2002488

(51) Int. Cl.
*H01Q 3/26* (2006.01)
*H01Q 1/52* (2006.01)

(52) U.S. Cl.
CPC ........... *H01Q 3/2605* (2013.01); *H01Q 1/523* (2013.01)

(58) Field of Classification Search
CPC .... H01Q 3/2605; H01Q 1/523; H01Q 3/2694; H04B 7/0617; H04B 7/086
See application file for complete search history.

(56) References Cited

U.S. PATENT DOCUMENTS

| | | | |
|---|---|---|---|
| 8,698,696 | B1 | 4/2014 | McCandless |
| 9,478,858 | B1 | 10/2016 | West |

(Continued)

FOREIGN PATENT DOCUMENTS

| | | | |
|---|---|---|---|
| EP | 3425732 | A1 | 1/2019 |
| WO | WO-03/047033 | A1 | 6/2003 |
| WO | WO-2017/153985 | A1 | 9/2017 |

OTHER PUBLICATIONS

Divaydeep Sikri et al: "Multi-Beam Phased Array with Full Digital Beamforming for SATCOM and 5G", Microwave Journal, Apr. 1, 2019, pp. 64-79.

(Continued)

*Primary Examiner* — William Kelleher
*Assistant Examiner* — Ismaaeel A. Siddiquee
(74) *Attorney, Agent, or Firm* — PEARL COHEN LLP

(57) ABSTRACT

An antenna topology supporting multi beamforming for a large phase array antenna is provided herein. The antenna topology includes: one or more pairs of branches, each branch comprising a plurality of digital beamforming (DBF) integrated circuits (ICs) connected in series via a bus; one or more splitter/combiner (S/C) ICs connecting together each of the branches of the pairs; and one or more layers of further S/C ICs, wherein each of the further S/C ICs connects two of the S/C ICs on one end, and a modem or a further S/C IC of a different layer, on the other end, wherein each of the DBF ICs is coupled to two or more antenna elements via one or more radio frequency (RF) ICs, and wherein each of the DBF ICs comprises phase shifting circuitries, delay circuitries, memory circuitries, and bus controlling circuitries.

10 Claims, 6 Drawing Sheets

(56) References Cited

U.S. PATENT DOCUMENTS

| | | | | |
|---|---|---|---|---|
| 2002/0140616 | A1 | 10/2002 | Kanamaluru | |
| 2005/0093744 | A1 | 5/2005 | Davis | |
| 2007/0257800 | A1* | 11/2007 | Yang | G06K 19/073 343/841 |
| 2010/0277371 | A1 | 11/2010 | Markus | |
| 2011/0032173 | A1* | 2/2011 | Chang | H01Q 3/04 343/880 |
| 2018/0287694 | A1 | 10/2018 | Buehler | |
| 2019/0273524 | A1* | 9/2019 | Rainov | H04B 1/16 |
| 2020/0295854 | A1* | 9/2020 | Narra | H04B 7/0608 |
| 2022/0360303 | A1* | 11/2022 | Rainish | H04B 7/0848 |
| 2023/0253704 | A1* | 8/2023 | Sundström | H04B 7/0617 375/267 |

OTHER PUBLICATIONS

Office Action for GB Application No. 2002488.1, mailed Aug. 14, 2020.

International Search Report and Written Opinion for PCT Application No. PCT/EP2021/054082, mailed Jun. 4, 2021.

* cited by examiner

200

400

SCALABLE MULTI BEAMFORMING TOPOLOGY SUPPORTING AN ELECTRONICALLY STEERED ARRAY ANTENNA

CROSS REFERENCE TO RELATED APPLICATIONS

This Application is a continuation of PCT Application No. PCT/EP2021/054082 filed on Feb. 18, 2021, which claims priority from GB Patent Application No. 2002488.1 filed on Feb. 21, 2020, all of which are incorporated herein by reference in their entireties.

FIELD OF THE INVENTION

The present invention relates generally to the field of beamforming, and more particularly to multi beamforming phased array antennas.

BACKGROUND OF THE INVENTION

Phased array antennas (PAAs) offer many advantages including electronic beam steering and scanning, optimized beam pattern with reduced sidelobes, and reduced power consumption and weight. True-time-delay (TTD) steering techniques are typically required for controlling operation of multiple antenna elements in the array, while keeping the broad bandwidth of the antenna radiation and allowing a large scan angle, so that efficient elemental vector summation (in the receive mode) or distribution (in the transmit mode) can be obtained that is independent of frequency or angle.

Various beam forming techniques for use in such antennas have been developed, and are described, for example in US Patent Application Publication No. 2002/140616, U.S. Pat. No. 8,698,696 and US Patent Application Publication no. 2010/277371, all of which are incorporated herein by reference in their entirety.

Conventional antenna systems, based on analogue signal processing, are cumbersome and costly to implement with analogue processing channels, particularly when large antenna arrays are required (with large dimensions of the antenna radiating part and/or large number of antenna elements). This might be due to the fact that RF transmission lines and analogue RF processing modules introduce various artifacts to the analogue signals propagating therethrough, and thus suffer, inter alia, from a mismatch of signal parameters between antenna elements, i.e. gain, phase, frequency parameters, which deteriorates the beam forming accuracy. This is more critical for large-scale antennas, having long transmission lines that need to be calibrated. The complexity, and the effects of the artifacts increases n-fold if multi-beam antenna is required.

An Electronically Steered Array Antenna (ESAA) is an array of antennas in which the relative phases or delays of the respective signals feeding the antennas are set in such a way that the effective radiation pattern of the array is reinforced in a desired direction and, at the same time, it is suppressed in undesired directions. The relationships among the antennas (relative delay, phase, gain and the like) may be fixed, or may be adjustable.

An ESAA system may be configured to operate digitally in the base band of the signal to be transmitted/received, for introducing the proper phase and/or time delays already in the base band, while also compensating for the analogue artifacts resulted from the analogue RF front end connected between the system and the antennas. Additionally, the system provides scalable architecture for construction of large-scale antennas.

FIG. 1 is a block diagram illustrating a modular array antenna of an ESAA having a topology utilizing digital beamforming (DBF) integrated circuits (IC) in accordance with the prior art.

Antenna system 10 may include a scalable large number of antenna array units ("tiles") 11-1 to 11-N wherein each of the tiles (implemented as printed circuit board) accommodates a digital beamforming (DBF) integrated circuit (IC) 12-1 to 12-N respectively. Each of the (DBF) integrated circuit (IC) 12-1 to 12-N is further connected to two or more radio frequency (RF) ICs that are connected each to two or more phased array antenna elements (transducers).

Additionally, all DBF ICs 12-1 to 12-N are connected over a "daisy chain" bus (e.g. "SerDes" bus) to each other and finally to an antenna controller 14. Antenna controller 14 may implement an Integrated Antenna Controller and Modem on an IC. Among other functionalities antenna controller 14 may control the configuration of any of the DBF, RFIC, the bus as well as handle antenna calibration and antenna power control, over a "daisy chain" topology.

While the aforementioned topology provides scalability and modularity and more "tiles" can be easily added to the "daisy chain", there are several drawbacks of this topology that greatly affects the performance of the antenna, specifically with a large number of antenna elements.

By way of a non-limiting example, a daisy chain topology supporting 32 DBF ICs, each accommodating 4 RFICs and 16 antenna elements yields over 500 antenna elements altogether.

Given that that antenna controller 14 is required to wait for all DBF ICs readouts to arrive, the latency associated with, 32 DBF ICs is upper limit to what is needed to support True-time-delay (TTD) application. Adding more and more tiles to the daisy chain will increase the latency to a point where TTD cannot be achieved.

Additionally, the amount of memory the DBF IC need to be able to accommodate in the data retention process needed for properly implementing digital beamforming will also increase to a point where it will be impractical to manufacture such an DBF IC. Specifically, this will result in a large memory requirement for delaying the signal sufficiently in the first receive beamformer in the chain (closest to the modem) to combine coherently with the last receive beamformer (furthest from the modem) in the chain.

SUMMARY OF THE INVENTION

In order to address the aforementioned technical challenge, and according to some embodiments of the present invention, an antenna topology supporting multi beamforming for a large phase array antenna is provided herein. The antenna topology may include: one or more pairs of branches, each branch comprising a plurality of digital beamforming (DBF) integrated circuits (ICs) connected in series via a bus; one or more splitter/combiner (S/C) ICs connecting together each of the branches of the pairs; and one or more layers of further S/C ICs, wherein each of the further S/C ICs connects two of the S/C ICs on one end, and a modem or a further S/C IC of a different layer, on the other end, wherein each of the DBF ICs is coupled to two or more antenna elements via one or more radio frequency (RF) ICs, and wherein each of the DBF ICs comprises phase shifting circuitries, delay circuitries, memory circuitries, and bus controlling circuitries.

Yet another drawback of the aforementioned daisy chain topology refers to the digital bus interface connecting the DBF ICs and bandwidth limitation. Phased array antenna for multi beamforming require high speed digital I/Fs and are typically 8 bits wide. If the combined signal exceeds this, it will saturate the interface. This requires some compression to fit the data within the dynamic range which leads to addition of quantization noise as different BFs are summed up on the interface. Hence, the longer the daisy chain, the greater the increase in quantization noise leading to lower signal to noise ratio (SNR).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
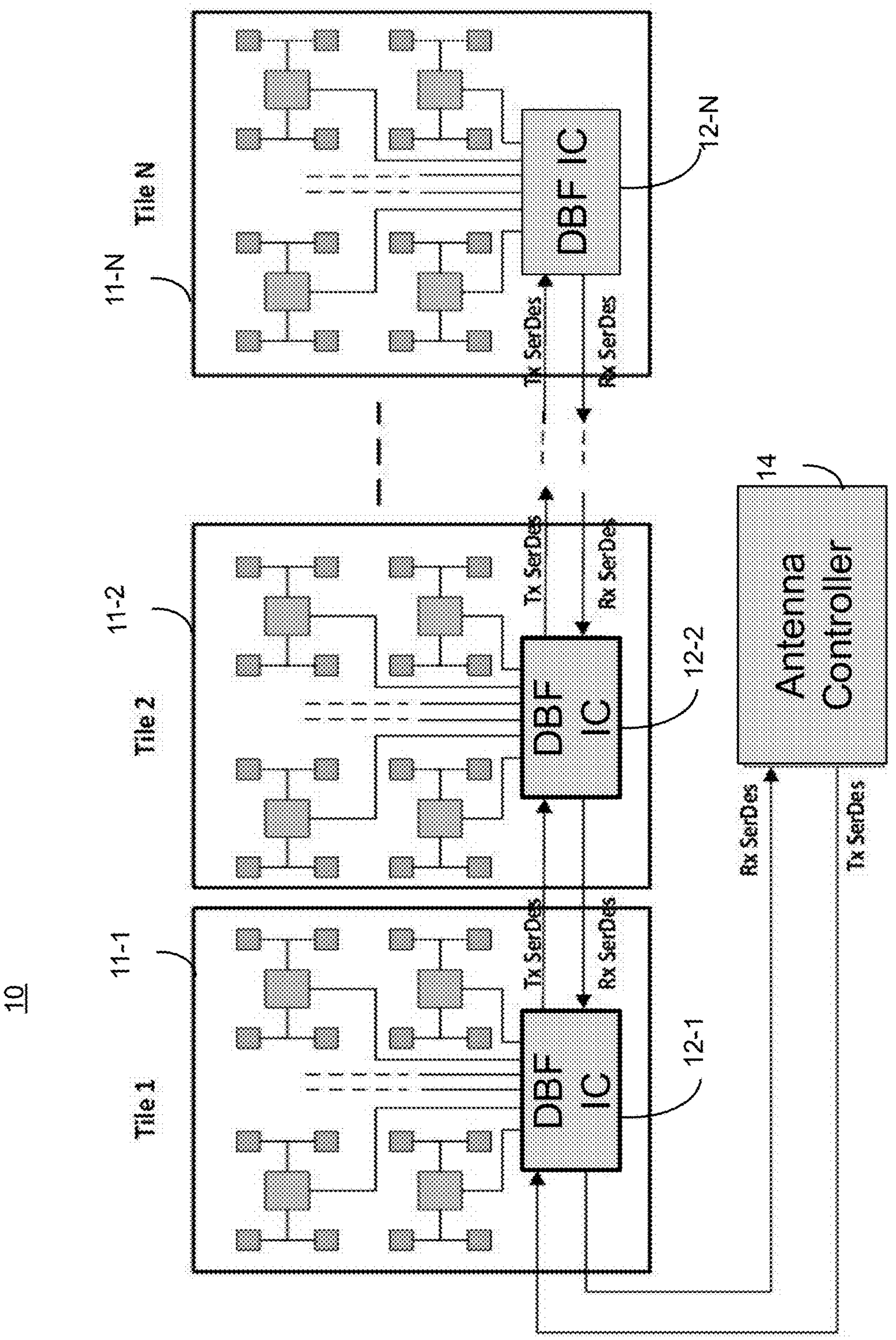
Figure 1 (Prior Art)
FIG. 1 is a block diagram illustrating a modular array antenna topology utilizing digital beamforming (DBF) integrated circuits (IC) in accordance with the prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 2A:
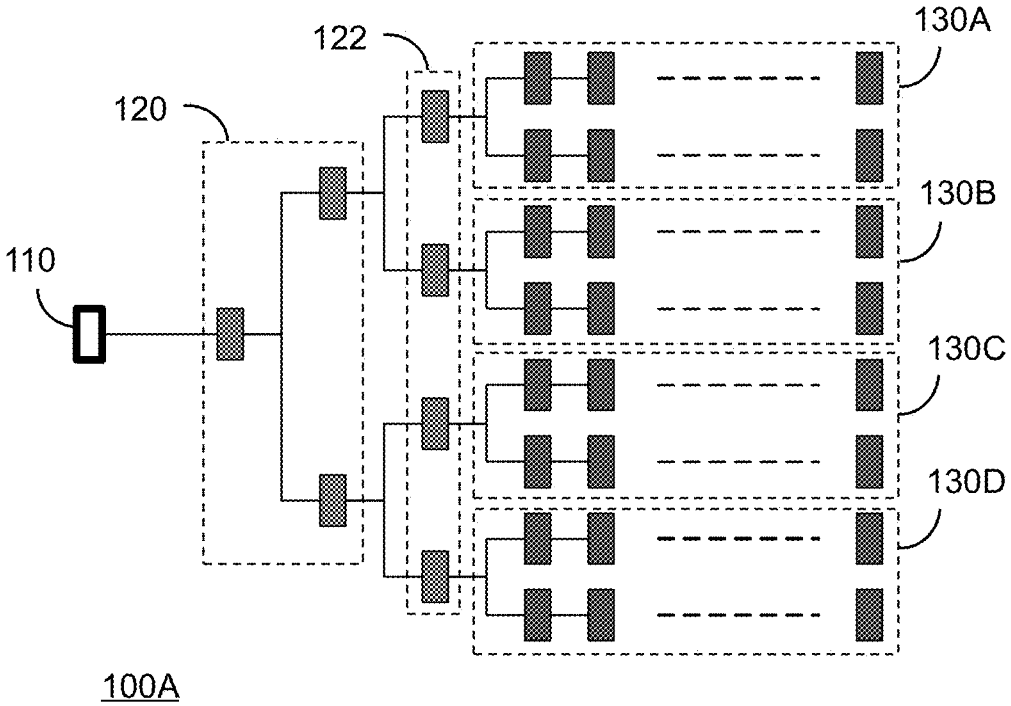
FIG. 2A is block diagram illustrating a non-limiting antenna topology supporting a multi beamforming large phased array antenna utilizing DBF ICs in accordance with some embodiments of the present invention.

FIG. 2A is block diagram illustrating a non-limiting exemplary embodiment of an antenna system 110A exhibiting a topology that supports a multi beamforming large phased array antenna utilizing DBF ICs in accordance with some embodiments of the present invention.

Antenna system 100A is an electronically steered multi-beam antenna which includes one or more pairs of branches 130A to 130D, each branch comprising a plurality of digital beamforming (DBF) integrated circuits (ICs) connected in series via a bus. Antenna system 100A further include one or more splitter/combiner (S/C) ICs 122 connecting together each of the branches of pairs of branches 130A to 130D and one or more layers of further S/C ICs 120 wherein each of further S/C ICs 120 connects two of S/C ICs 122 on one end, and a modem 110 or a further S/C IC 120 of a different layer, on the other end. Each of the DBF ICs is coupled to two or more antenna elements (shown in FIG. 1) via one or more radio frequency (RF) ICs (shown in FIG. 1) and wherein each of the DBF ICs include the following functionalities: phase shifting circuitries, delay circuitries, memory circuitries, and bus controlling circuitries.

In operation, when antenna system 100A is in a receiver configuration, RF signals are fed via the antennal elements through the RFICs and then processing over the various DBFs functionalities. Embodiments of the present invention provide a "divide and conquer" approach where shorter chains of DBF are used in parallel and in a synchronized manner so that latency is reduced. Similar approach is implemented in the transmitted configuration, with the necessary amendment.

According to some embodiments of the present invention, the S/C ICs and further S/C ICs are implemented by the DBF ICs configured as S/C. According to some embodiments of the present invention, the S/C ICs and further S/C ICs are configured to output data usable for quality assurance. According to some embodiments of the present invention, the antenna may further include a single branch comprising a plurality of DBF ICs connected in series via a bus, wherein the single branch is connected via one of the further S/C ICs to one of the S/C ICs connecting one of the pairs.

According to some embodiments of the present invention, the plurality of DBF ICs of each of the branches, respectively, are controlled to implement coherent combining of signals associated with the antenna elements connected to the branches, respectively.

According to some embodiments of the present invention, wherein the plurality of DBF ICs of each of the branches are configured to communicate with the S/C IC connecting each of the pairs, in accordance with a scheduling scheme associated with multi-beam steering.

According to some embodiments of the present invention, the two or more antenna elements coupled to each of the DBF ICs may include 16 antenna elements via 4 respective RFICs. According to some embodiments of the present invention, wherein the bus is a Serializer/Deserializer (SerDes).

According to some embodiments of the present invention, the antenna may be further configurable either as a transmitter or a receiver. According to some embodiments of the present invention, the antenna elements form a phased array antenna.

Figure 2B:
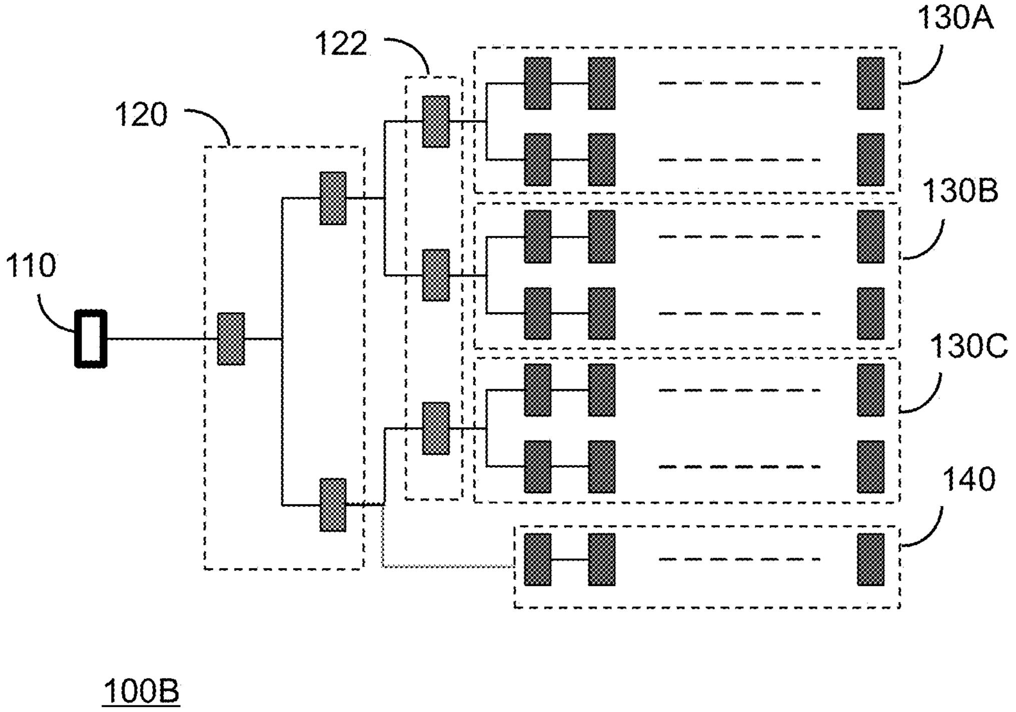
FIG. 2B is block diagram illustrating a non-limiting antenna topology supporting a multi beamforming large phased array antenna utilizing DBF ICs in accordance with other embodiments of the present invention.

FIG. 2B is block diagram illustrating a non-limiting antenna topology supporting a multi beamforming large phased array antenna utilizing DBF ICs in accordance with other embodiments of the present invention. The antenna topology of 100B is identical to that of system 100A however it can handle odd number of chains so that it can accommodate pairs of branches 130A to 130C but also a single branch 140.

Figure 3:
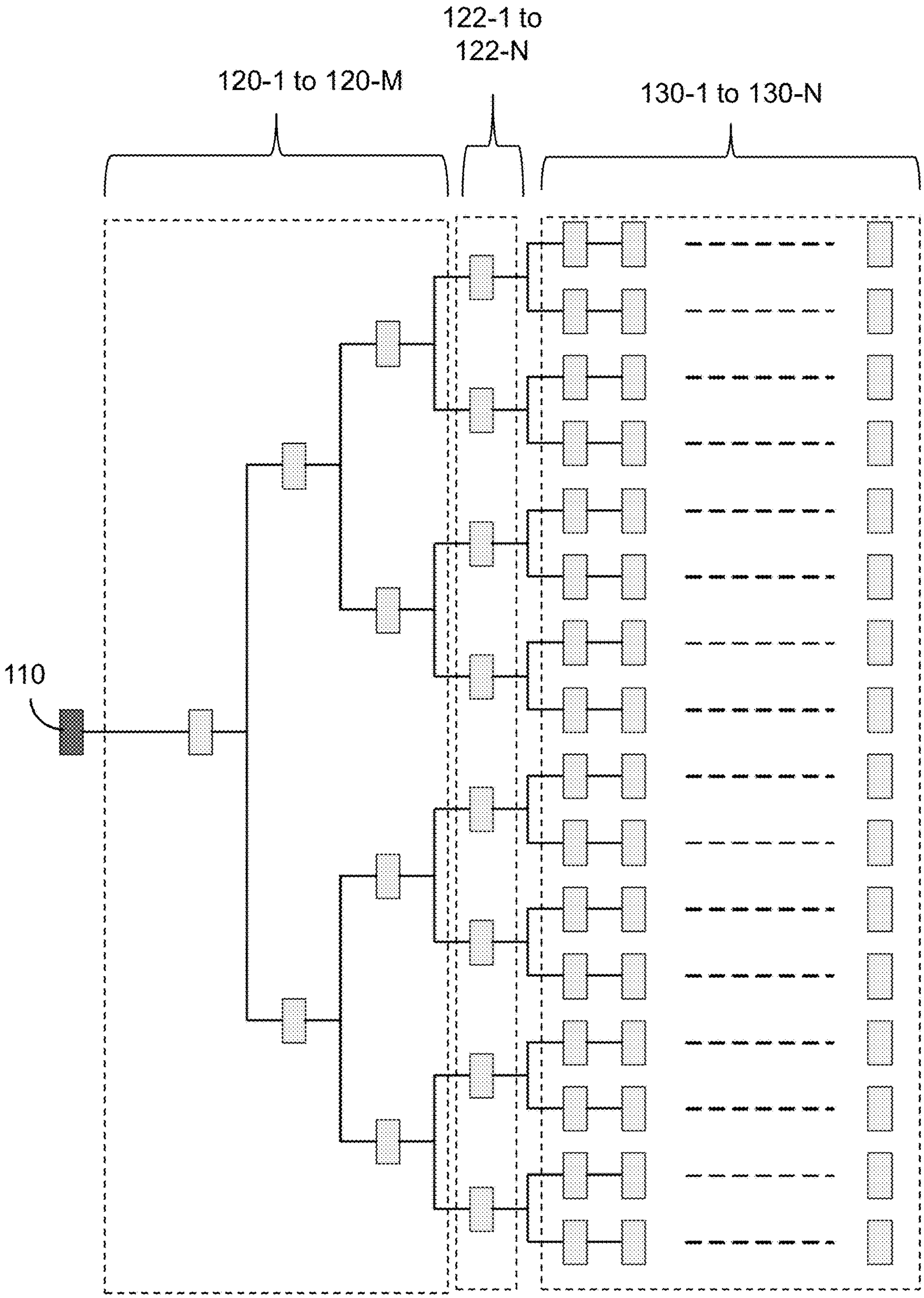
FIG. 3 is block diagram illustrating further details of a non-limiting antenna topology supporting a multi beamforming large phased array antenna utilizing DBF ICs in accordance with other embodiments of the present invention.

FIG. 3 is block diagram illustrating further details of a non-limiting antenna topology supporting a multi beamforming large phased array antenna utilizing DBF ICs. Antenna system 200 is an electronically steered multi-beam antenna which includes one or more pairs of branches 130-1 to 130-N, each branch comprising a plurality of digital beamforming (DBF) integrated circuits (ICs) connected in series via a bus. Antenna system 200 further includes one or more splitter/combiner (S/C) ICs 122-1 to 122-N connecting together each of the branches of pairs of branches 130-1 to 130-N and one or more layers of further S/C ICs 120-1 to 120-M wherein each of further S/C ICs 120-1 to 120-M connects two of S/C ICs 122-1 to 122-N on one end, and a modem 110 or a further S/C IC 122-1 to 122-N of a different layer, on the other end. As explained above, the DBF ICs are coupled to two or more antenna elements (shown in FIG. 1) via one or more radio frequency (RF) ICs (shown in FIG. 1) and each of the DBF ICs includes the following functionalities: phase shifting circuitries, delay circuitries, memory circuitries, and bus controlling circuitries.

Figure 4:
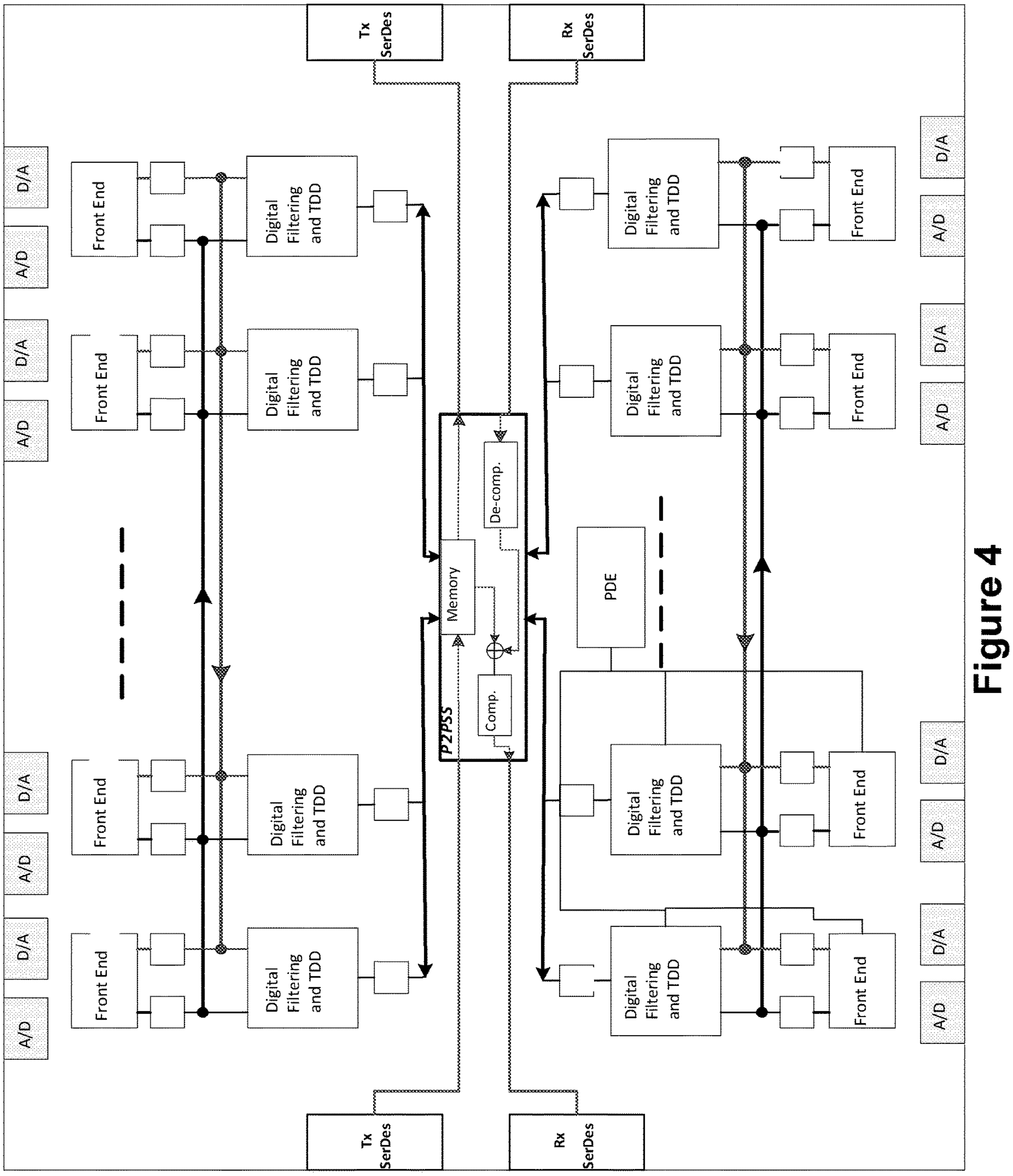
FIG. 4 is a block diagram illustrating a non-limiting DBF IC suitable for use in the antenna topology in accordance with some embodiments of the present invention.

FIG. 4 is a block diagram illustrating in further details, a non-limiting DBF IC suitable for use in the antenna topology in accordance with some embodiments of the present invention. The following description serves as a technical enabler to the building block of the antenna topology described herein.

A Digital Beamforming Integrated Circuit (DBF IC) 400 or a set of such DBF ICs as the case may be, construed in accordance with some embodiments of the present invention allows its integration within a ESAA, such that the design is scalable to meet the required antenna size and number of beams The DBF IC (sometimes referred hereinafter as “chip”, “beamforming chip” or “digital beamforming chip”) and ESAA may optionally further include a self-calibration circuitry.

According to some embodiments of the present invention, DBF IC 400 may include a plurality of digital baseband beam forming channels configured and operable for connecting via channel ports to a plurality of antenna channels associated with respective antenna elements for at least one of transmitting and receiving through the plurality of antenna elements one or more waveform signals encoding data streams; wherein the digital baseband beam forming channels are configured and operable to apply at least one of phase and time delays of selective magnitudes to baseband signals associated with data streams encoding the waveform signals transmitted and/or received by the plurality of antenna elements, thereby beamforming the waveform signals to produce, by the waveforms, one or more data encoded beams associated with respective directions of propagation and encoding the data streams respectively.

The digital baseband beam forming channels may be configured and operable to apply selective true time delays to the baseband signals that are communicated therethrough to thereby beamform the waveform signals. For example, each data stream is encoded in the baseband signal in the form of a stream of symbols communicated serially at a sampling rate through one or more of the digital baseband beam forming channels. According to some embodiments, each digital baseband beam forming channel of the one or more digital baseband beam forming channels comprises a true time delay module adapted to selectively apply a selected true time delay to the stream of symbols communicated through the digital baseband beam forming channel to thereby apply the beamforming. According to some embodiments, the true time delay module is configured and operable to facilitate selected time delays with time resolution lower than the sampling time of the digital baseband beam forming channel thereby enabling to apply the beamforming with delay resolution better than the sampling time thereby enabling beamforming with improved directional accuracy.

For example, the true time delay module comprises an adjustable time delay re-sampler module. This module is configured and operable to carry out the following: receive a digitized signal representing the stream of symbols, obtain control instructions indicative of a time delay fraction by which to delay the digitized signal whereby the time delay fraction includes a component of time smaller than a sampling time associated with the sampling rate of the digital baseband beam forming channel; resample the digitized signal via interpolation to obtain a time shifted resampled signal having the similar number of symbols as the digitized signal; and output the resampled signal thereby introducing of time delay with the time resolution higher than the sampling rate.

The true time delay module may be configured and operable for delaying the baseband signal propagation in the digital baseband beam forming channel with a time delay of resolution higher than the sampling rate of the digital baseband beam forming channel. Such true time delay module comprises: a shift register operable for delaying the baseband signal by an integer part of the time delay that measures to an integer multiplication of a sampling time of the digital baseband beam forming propagation; and an adjustable time delay re-sampler module configured and operable for delaying the baseband signal by a time delay fraction includes a component of the time delay that smaller than a sampling time of the sampling time of the digital baseband beam forming channel.

In some embodiments, the true time delay module comprises a complex gain module configured and operable for multiplying the symbols by a complex gain selected to adjust the time delay to compensate for effects associated in up/down conversion between the baseband signal and a passband signal.

The digital baseband beamforming channels of the DBF IC according to some embodiments of the present invention are operable in at least one or more of the following: transmission mode; reception mode; and both transmission and reception modes.

Thus, the TTD circuitry includes a shift register for delay which is an integer multiple of the sampling time and a circuitry for delays smaller than the sampling time. Delays smaller than the sampling time are calculated by performing an inter-sample interpolation, for example by utilizing a Farrow structure filter. The system also comprises digital compensation elements (e.g. digital compensation processing channels) which are configured to carry out at least one function from among the following: gain adjustment, phase adjustment, delay adjustment, I/Q mismatch correction, equalization and digital pre-distortion.

In some embodiments, the system includes digital compensation channels. Each digital compensation channel is connectable in between at least one of the digital baseband beam forming channels and at least one of the channel ports of the DBF IC, and is configured and operable to apply digital compensation to the signals of the at least one channel port for compensating over analogue artifacts associated with antenna channel(s) of an analogue RF frontend module connecting the at least one channel port to one or more of the antenna elements. For example, each digital compensation channel is respectively selectively connectable in between selected one or more of the digital baseband beam forming channels and at least one channel port of the DBF IC. In this case, the DBF IC comprises an antenna channel combining/distributing module configured and operable for receiving beamforming configuration instructions indicative of the selected one or more of the digital baseband beam forming channels and at least one channel port and selectively connecting the selected one or more of the digital baseband beam forming channels to the at least one channel port via the digital compensation processing channel.

In case where one or more of the digital baseband beam forming channels is/are operable in at least transmission mode to enable transmission of one or more of waveform signals corresponding to the baseband signals, the at least some of the digital compensation processing channels may be operable in the transmission mode and comprise respective non-linear pre-distortion modules. Each non-linear pre-distortion module may be configured and operable for adjusting amplitudes and phases of respective symbols communicated therethrough so as to compensate for a non-linear distortion applied to the symbol by an amplifier of the antenna channel coupled to the respective channel port. The non-linear pre-distortion module may be associated with a non-linear distortion reference data indicative of nonlinear amplification distortion of the associated antenna channel.

Each digital compensation processing channel may also comprise a respective equalization module configured and operable for adjusting respective phases and gains of different frequency components of the baseband signal communicated in between the at least one digital baseband beam forming channel(s) and the at least one channel port associated with the digital compensation processing channel in accordance with respective frequency response indicative of phase shifts and gain variations applied to passband frequency components corresponding to the different frequency components by an antenna channel coupled to the channel port. It should be noted that the baseband signal may encode a data stream of symbols. In this case, the frequency components in the baseband signal are associated with a plurality (sequence) of symbols of the data stream. In turn, the equalization module is associated with gain variations and phase shift reference data indicative of the gain variations and phase shifts corresponding to the different frequency components that are introduced by the associated antenna channel.

In some embodiments, the digital baseband beam forming channels are configured and operable for processing the baseband signal in in-phase and quadrature (I/Q) representation, and each digital compensation processing channel comprises an I/Q correction module configured and operable for compensating over at least one of gain and skew errors in the I/Q representation of the baseband signals communicated in between the at least one digital baseband beam forming channel and the at least one channel port associated with the digital compensation processing channel to thereby compensate over DC offset values in the I and Q channels.

In this regard, it should be noted that in some cases the DBF IC is configured such that signals are communicated between the digital baseband beam forming channels and associated channel ports are in the form of in-phase and quadrature (I/Q) representation of the baseband signals.

In some cases, the DBF IC may be configured such that signals are, in the channel ports, in the form of intermediate (IF) frequency signals (e.g. passband signals). Each digital baseband beam forming channel includes a frequency converter (Up and/or Down converter) for converting between the baseband signal of the digital baseband beam forming channel and the intermediate or passband frequency signals of the associated antenna channel.

The system may comprise a plurality of antenna/channel ports for connecting the digital baseband beamforming channels of the DBF IC to a plurality of antenna channels associated with respective antenna elements. For example, the antenna ports are adapted for communicating at least one of: I/Q, IF signals with the antenna channels. It should be noted that the antenna ports may be analogue ports and the DBF IC may include a plurality of signal converters between digital and analogue associated respectively with the antenna ports for converting between analogue signals at the antenna ports and digital signals of the digital baseband beamforming channels.

The system may be configured and operable for selectively producing, by the waveforms, a selected number of the one or more data encoded beams of at least one of selectable bandwidths and data-rates and selectable beamwidths. To this end, the DBF IC according to some embodiments of the present invention may include a pool of the plurality of digital baseband beamforming channels, and an antenna channel combining/distributing circuitry configured and operable for selectively connecting baseband beamforming channels of the pool to the plurality of antenna ports according to control parameters indicative of the selected number of beams, and desired bandwidth and beam width of each beam.

The DBF IC according to some embodiments of the present invention may include a data control input port configured and operable for receiving a control parameters indicative of one or more of the following parameters of the beams: the selected number of beams; selected antenna ports to be commonly or exclusively allocated to each of the selected number of beams; the sampling rate allocated for each of the selected number of beams The antenna channel combining/distributing module (circuitry/network) is connectable to the control input port for receiving the control parameters therefrom. The control input port may be configured and operable for receiving a directional control parameters indicative of selected directions of the beams The digital baseband beamforming channels of the pool are connectable to the control input port for receiving the directional control parameters and are configured and operable for introducing time delays to the baseband signals processed thereby in accordance with the directional control parameters so as to produce the beams in the selected directions.

The control input port may be configured and operable for receiving a signal calibration parameters indicative of at least one of the following signal corrections for implementing accurate beamforming by the signals communicated via the channel ports: (i) a non-linear pre-distortion correction associated with non-linear pre-distortion of an antenna channel connected to the operative one of the digital baseband beamforming channels; (ii) frequency equalizing calibration associated with frequency response of an antenna channel connected to the operative one of the digital baseband beamforming channels; (iii) I/Q correction factors; and (iv) at least one or more of Gain, phase and time delay correction required for the beamforming. The DBF IC according to some embodiments of the present invention may include the digital compensation processing channels configured and operable for processing baseband signals associated with signals communicated via the channel ports for introducing signal corrections to the baseband signals processed thereby in accordance with the signal calibration parameters.

The DBF IC according to some embodiments of the present invention may be configured and operable for selectively encoding one or more data streams in a selected number of the one or more data encoded beams respectively. To this end, the DBF IC may include: a pool of the plurality of digital baseband beamforming channels; a data bus port for providing the one or more data streams associated with the selected numbers of the beams respectively; and a data combining/distributing circuitry connectable to the data bus and the beamforming channels and configured and operable to selectively communicating each data-stream of the one or more data stream in between the data bus and the respective digital baseband beamforming channels associated with production of the respective beam encoding the data-stream.

The data control input port may be configured and operable for receiving data-stream control parameters associating data-streams of the bus with the beams The data combining/distributing circuitry is connectable to the data control input port and carrying out the communicating of the data-streams according to the data-stream control parameters.

The DBF IC according to some embodiments of the present invention may be configured and operable to allocate a variable number of the digital baseband beamforming channels to transmit and receive one or more of the beams.

The DBF IC according to some embodiments of the present invention may be configured to allocate a variable number of digital baseband beamforming channels to different beams.

The DBF IC according to some embodiments of the present invention may be configured to associate a variable number of digital baseband beamforming channels with selected antenna ports to thereby enable operating an antenna array connected to the antenna ports in an independent subarrays mode.

The antenna array connectable to the antenna ports may comprise antenna elements of various polarizations associated different respective ones of the antenna ports and wherein the DBF IC is configured to associate a variable number of digital baseband beamforming channels with selected antenna ports to thereby enable control over vertical polarization, horizontal polarization, or any slant angle polarization of the beams. The DBF IC may be configured for supporting right hand circular polarization, left hand circular polarization or any required elliptical polarization.

The DBF IC according to some embodiments of the present invention may be configured and operable for communicating, in the antenna ports, signals of intermediate frequency ranging from zero (baseband signaling) to half the sampling rates of the beamforming channels.

The DBF IC according to some embodiments of the present invention may include a predetermined number of antenna ports for connecting to up to the predetermined number of antenna elements in an antenna array; and wherein the DBF IC is configured and operable for connecting in a chain to additional one or more DBF ICs, thereby providing scalability for controlling an operation of antenna array with number of antenna elements larger than the predetermined number of antenna ports.

For example, the DBF IC according to some embodiments of the present invention may be configured and operable for implementing a chain connection via the data bus of the DBF IC. The data bus of the DBF IC may be associated with a Serializer/Deserializer module connectable to a general bus of an antenna system via Serializer/Deserializer repeater module enabling the daisy chain connection.

The DBF IC may include a beamforming logic processor module comprising a central processing unit (CPU) and a storage section. Alternatively or additionally, a beamforming logic processor module is connectable to a control input port of the DBF IC and configured and operable for carrying out one or more of the following: processing beamforming control instructions provided via the control input port data indicative of one or more beams to be produced by the system and operate the beam former channels of the DBF IC to introduce corresponding delays to the baseband signals processed thereby for forming the beams; processing at configuration instructions provided via the control input port data indicative of predetermined allocation of the beam formers to the channel ports for enabling production of predetermined number of beams of predetermined bandwidth or beam width, and allocations of the data-streams to the predetermined number of beams and operating antenna channel combining/distributing module of the DBF IC to allocation of the beam formers to the channel ports, and operating a data channel combining/distributing module of the DBF IC to direct the data-streams, which are allocated to the beams, to/from respective beamformer channels associated with the production of the beams respectively; processing analogue channel calibration parameters associated with artifacts of analogue channels of an RF frontend module connectable to the DBF IC via the channel ports to determine correction parameters to be applied to signals of the channel ports and operating a plurality of digital compensation processing channels of the DBF IC based on the correction parameters for digitally compensating for the artifacts of the analogue channels of the RF frontend module.

The beamforming logic processor module may be configured and operable for performing one or more of the following: Implementing beam forming/steering in the digital domain by using true time delay; Direction of Arrival estimation; tracking of known signals.

The DBF IC in accordance with some embodiments of the present invention may be configured and operable as a digital baseband beamforming chip for use in an array including a plurality of similar digital baseband beamforming chips. Each such chip is connectable to a respective group of antenna elements of an antenna array via an RF front end module for at least one of transmitting and receiving beam formed waveform signals by the respective group of antenna elements. The beamforming chip may be adapted to be connected in a chain to one or more beamforming chips of the plurality of similar beamforming chips via a common bus through which data streams encoded in the beam formed waveform signals are communicated to/from the beamforming chip beam.

For example, the array of the similar digital baseband beamforming chips is an array of chipsets, each comprising one of the digital baseband beamforming chips and one or more analogue RF frontend chips connectable in between the digital baseband beamforming chip and its respective group of antenna elements.

The DBF IC according to some embodiments of the present invention may include a global time delay module configured and operable for introducing time delays to the plurality of data streams communicated in between the beamforming chip and the bus so as to enable to timely synchronize the respective operations of the plurality of similar digital baseband beamforming chips thereby facilitating implementation of collective beamforming of waveforms that are collectively transmitted/received by the plurality of groups of antenna elements that are respectively connected to the plurality of similar digital baseband beamforming chips.

Some embodiments of the present invention provide a scalable array comprising a plurality of the above-described DBF ICs. The scalable array may include a plurality of similar digital baseband beamforming chips each connectable to a respective group of antenna elements of an antenna array via an RF frontend module for at least one of transmitting and receiving beam formed waveform signals by the respective group of antenna elements. The scalable array may be an antenna array comprising a tiling of a plurality of subarrays each including the above-described digital baseband beamforming chip and a respective group of antenna elements constituting a sub-antenna array connected to the sub-antenna array via an RF frontend module.

The scalable array may include a global control unit connectable to the plurality of digital baseband beamforming chips via control input ports thereof and configured and operable for operation of the plurality of digital baseband beamforming chips in synchronization, for collectively receiving and/or transmitting one or more beam formed waveform signals by the antenna array connected thereto. For example, the global control unit may be adapted to operate the array in a plurality of digital baseband beamforming chips in multi-beam configuration comprising at least one beam; or may be adapted to operate the array in a plurality of digital baseband beamforming chips for generation a plurality of beams. The plurality of beams may be used to increase a total capacity of a communication system using the array antenna, and/or the plurality of beams may be used in a payload illuminating non-bordering beams, in order to avoid inter-beam interference.

Figure 5:
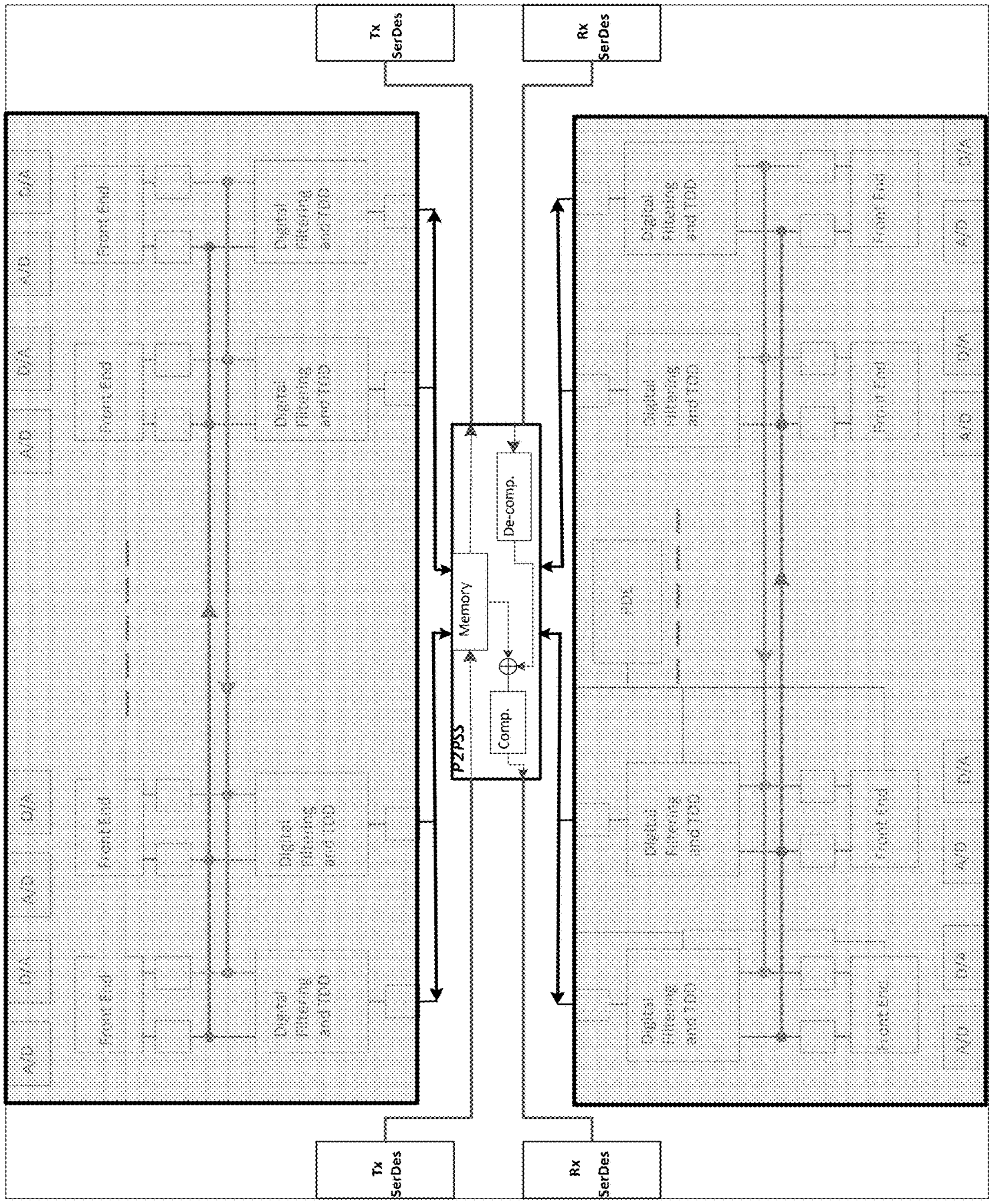
FIG. 5 is a block diagram illustrating a non-limiting DBF IC suitable for use in the antenna topology in accordance with some other embodiments of the present invention.

FIG. 5 is a block diagram illustrating a non-limiting DBF IC suitable for use in the antenna topology in accordance with some other embodiments of the present invention. The aforementioned DBF IC can have most of its functionalities disabled leaving only a splitter/combiner (S/C) functionality. In this way, the same DBF IC can be used as S/C in the antenna topology in accordance with some embodiments of the present invention.

Figure 6:
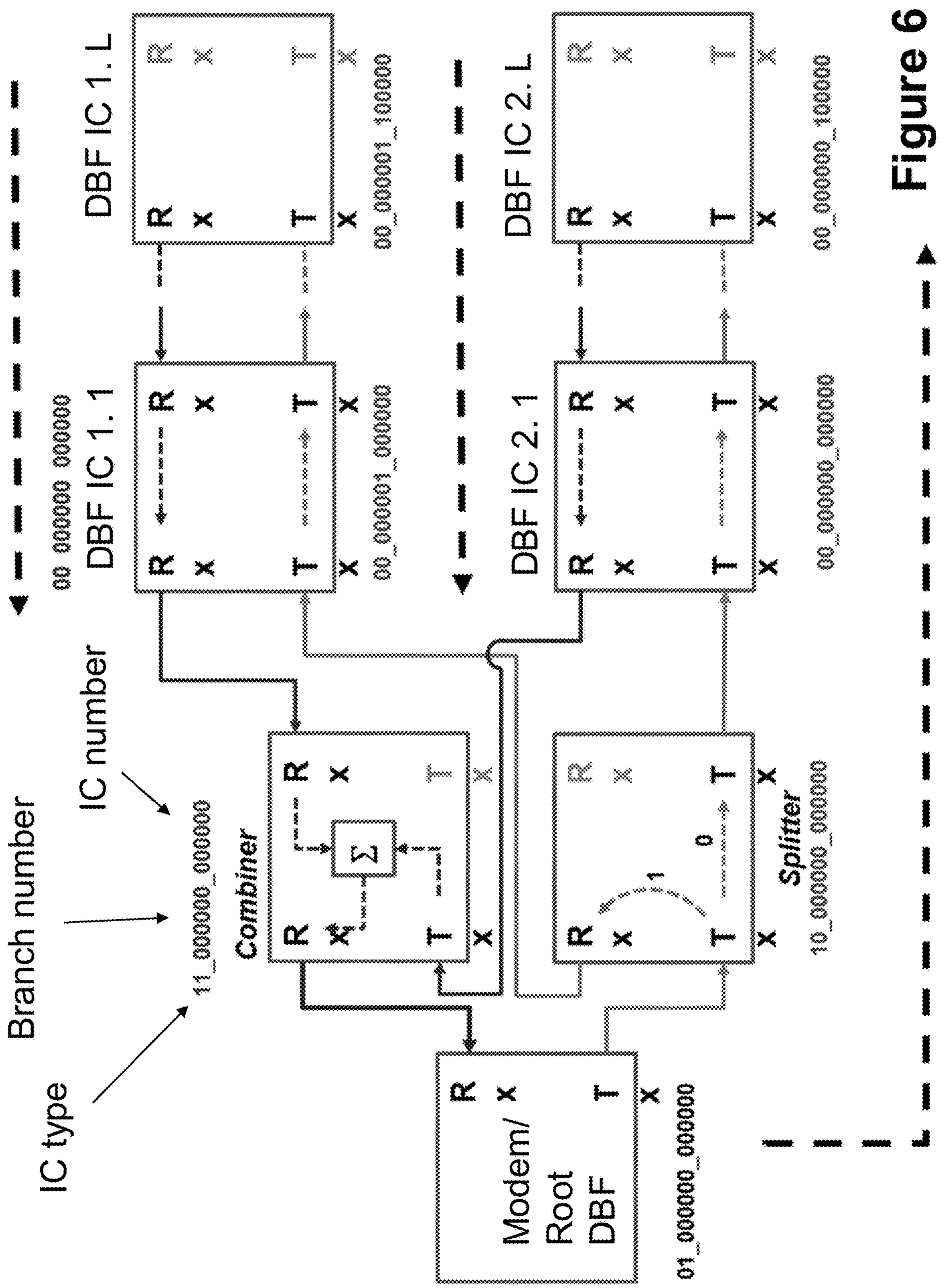
FIG. 6 is a block diagram illustrating an aspect of the non-limiting antenna topology supporting a multi beamforming large phased array antenna utilizing DBF ICs in accordance with other embodiments of the present invention.

FIG. 6 is a block diagram illustrating an aspect of the non-limiting antenna topology supporting a multi beamforming large phased array antenna utilizing DBF ICs in accordance with other embodiments of the present invention.

For a proper operation of the antenna system in accordance with embodiments of the present invention, it may be required that each of the DBF ICs and the S/C ICs are associated with a unique ID number (e.g. enumerated) so the data coming from either the DBF ICs or the S/C ICs can be allocated properly at the modem. It is suggested herein to have three fields for the unique ID that can support several layers of hierarchy in a manner that is fully scalable and can support any number of DBF ICs.

According to some embodiments of the present invention, one field of the unique ID may determine the type of IC (DBF IC, S/C IC, or a modem) while a second field may indicate the number of the branch and a third filed shall indicate the number of the IC in the branch. As an ordering convention, it is suggested herein in splitters will be enumerated first with the numbers going up from the modem and towards the antenna elements and combiners shall be enumerated towards end after flow is reversed.

As indicated above, embodiments of the present invention can advantageously be used in antenna systems including a relatively large (very large) antenna array and can be scaled per the user needs. This makes it possible to construct a full adaptive and steerable antenna system at a very low cost, weight and power consumption. This fact makes the system provided by some embodiments of the present invention a viable solution in a variety of applications.

Advantageously, the antenna topology in accordance with the embodiments of the present invention supports large antennas with deterministic latency. It further provides good utilization of the SerDes bus bandwidth. Furthermore, it optimizes the use of the memory within each of the DBF ICs. Additionally, in some embodiments it may use the DBF ICs in a dual splitter/combiner functionality as explained above leading, inter alia, to cost reduction by using the same chip for both.

Finally, and as explained above, in some embodiments it allows two branches ending a combiner node to be analyzed for signal quality assurance purposes.

As will be appreciated by one skilled in the art, aspects of the present invention may be embodied as a system, method or computer program product. Accordingly, aspects of the present invention may take the form of an entirely hardware embodiment (such as combination of any of: an integrated circuit (IC), discrete RF components and an RFIC), an entirely software embodiment (including firmware, resident software, micro-code, etc.) or an embodiment combining software and hardware aspects that may all generally be referred to herein as a "circuit", "module" or "system." Furthermore, aspects of the present invention may take the form of a computer program product embodied in one or more computer readable medium(s) having computer readable program code embodied thereon.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment" "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. An electronically steered digital beamforming antenna array system comprising:

a plurality of pairs of branches, each branch comprising a respective chain of a plurality of digital beamforming (DBF) integrated circuits (ICs) connected in series via a bus, the bus comprising a Serializer/Deserializer (SerDes), wherein the plurality of branches comprises at least two DBF chains that operate in parallel and in a synchronized manner to reduce latency relative to a single daisy-chain of DBF ICs;

one or more splitter/combiner (S/C) ICs connecting together each of the branches of said pairs; and one or more layers of further splitter/combiner (S/C) ICs arranged in a hierarchical tree, wherein each of the further S/C ICs connects exactlytwo S/C ICs on one end and connects, on the other end, to (i) the modem or (ii) a further S/C IC of a different layer, such that signal combining and splitting is performed across the layers to provide deterministic latency as the number of antenna elements increases, wherein each of said DBF ICs comprises phase shifting circuitries, delay circuitries, memory circuitries, and bus controlling circuitries, wherein, in a receiver configuration, coherent combining is performed by dividing the antenna array into the parallel synchronized DBF chains and combining outputs of the DBF chains via the hierarchical tree of S/C ICs such that a signal propagation from the DBF IC to the modem depends on a depth of the hierarchical tree;

wherein each of the S/C ICs comprise a splitter and a combiner, wherein a number of the one or more layers of further S/C ICs is selected in order to support a scalable topology of an increased number of antenna elements, and wherein the hierarchical tree of S/C ICs is selected such that memory required in each DBF IC for signal delaying to enable coherent combining is reduced relative to a single-chain topology as the number of antenna elements increases.

2. The system according to claim 1, further comprising a single branch comprising a plurality of DBF ICs connected in series via a bus, wherein said single branch is connected via one of said further S/C ICs to one of said S/C ICs connecting one of said pairs.

3. The system according to claim 1, wherein the plurality of DBF ICs of each of the branches, respectively, are controlled to implement coherent combining of signals associated with the antenna elements connected to said branches, respectively.

4. The system according to claim 1, wherein the plurality of DBF ICs of each of the branches are configured to communicate with the S/C IC connecting each of the pairs, in accordance with a scheduling scheme associated with multi-beam steering.

5. The system according to claim 1, configurable either as a transmitter or a receiver.

6. The system according to claim 1, wherein the antenna elements form a phased array antenna.

7. The system according to claim 1, wherein said S/C ICs and further S/C ICs are implemented by said DBF ICs configured as S/C.

8. The system according to claim 7, wherein the two or more antenna elements coupled to each of the DBF ICs comprise 16 antenna elements via 4 respective RFICs.

9. The system according to claim 1, wherein said S/C ICs and further S/C ICs are configured to output data usable for quality assurance (QA).

10. The system according to claim 1, wherein each of said DBF ICs is coupled to two or more antenna elements via one or more radio frequency (RF) ICs.

* * * * *